US012711010B2

(12) United States Patent
Mehta et al.

(10) Patent No.: US 12,711,010 B2
(45) Date of Patent: Aug. 18, 2026

(54) AUTODETECTION AND REMEDIATION OF HIGH PROCESSOR USAGE AT NETWORK DEVICES

(71) Applicant: Juniper Networks, Inc., Sunnyvale, CA (US)

(72) Inventors: Ruchit Rajkumar Mehta, Henderson, NV (US); Abhiram Madhugiri Shamsundar, San Jose, CA (US); Wenfeng Wang, Sunnyvale, CA (US); Priti Pallavi, Bengalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 35 days.

(21) Appl. No.: 18/774,745

(22) Filed: Jul. 16, 2024

(65) Prior Publication Data

US 2025/0068507 A1 Feb. 27, 2025

(30) Foreign Application Priority Data

Aug. 24, 2023 (IN) ............................ 202341056781

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/076* (2013.01); *G06F 11/079* (2013.01)

(58) Field of Classification Search
CPC .. G06F 11/0709; G06F 11/076; G06F 11/079; G06F 11/0793
See application file for complete search history.

(56) References Cited

U.S. PATENT DOCUMENTS 9,122,602 B1 * 9/2015 Jewell ................. H04L 41/0631
9,729,439 B2 8/2017 MeLampy et al.
9,729,682 B2 8/2017 Kumar et al.
9,762,485 B2 9/2017 Kaplan et al.
9,832,082 B2 11/2017 Dade et al.
9,871,748 B2 1/2018 Gosselin et al.
9,985,883 B2 5/2018 MeLampy et al.
10,200,264 B2 2/2019 Menon et al.
(Continued)

FOREIGN PATENT DOCUMENTS

CN 106656533 A 5/2017

OTHER PUBLICATIONS

International Search Report and Written Opinion of International Application No. PCT/US2024/043606 dated Nov. 26, 2024, 11 pp.

*Primary Examiner* — Joshua P Lottich
(74) *Attorney, Agent, or Firm* — Shumaker & Sieffert P.A.

(57) ABSTRACT

A network management system may collect processor usage statistics from one or more network devices. The network management system may determine, for each network device of the one or more network devices, aggregate processor usage statistics across a time window based on the processor usage statistics and, based on an aggregate overall processor usage for a given network device exceeding a baseline threshold, analyze aggregate per-process processor usage for the given network device to determine one or more processes as a root cause of anomalous behavior of the given network device. The network management system may generate a remedial action to remediate the root cause.

18 Claims, 10 Drawing Sheets

(56) References Cited

U.S. PATENT DOCUMENTS 10,277,506 B2 4/2019 Timmons et al.
10,432,522 B2 10/2019 Kaplan et al.
10,756,983 B2 8/2020 Ratkovic et al.
10,862,742 B2 12/2020 Singh
10,958,537 B2 3/2021 Safavi
10,958,585 B2 3/2021 Safavi
10,985,969 B2 4/2021 Safavi
10,992,543 B1 4/2021 Rachamadugu et al.
11,075,824 B2 7/2021 McCulley et al.
11,704,219 B1 * 7/2023 Lerner .................. G06F 11/327 714/57
2011/0231704 A1 * 9/2011 Ge ........................ G06F 11/079 714/E11.029
2012/0143795 A1 * 6/2012 Han ...................... G06F 11/079 714/E11.029
2013/0212440 A1 * 8/2013 Rom ................... G06F 11/0751 714/47.1
2014/0075327 A1 * 3/2014 Noel ................... G06F 11/0721 715/744
2016/0011925 A1 * 1/2016 Kulkarni ............. G06F 11/3409 714/57
2017/0091008 A1 * 3/2017 Cherbakov ......... G06F 11/0742
2019/0102240 A1 * 4/2019 Zarrini .................. G06F 11/079
2019/0132190 A1 * 5/2019 Jeyakumar .......... H04L 41/0631
2021/0306201 A1 9/2021 Wang et al.
2022/0382614 A1 * 12/2022 Chen ................... G06F 11/3419
2023/0231785 A1 7/2023 Kumar et al.
2023/0281070 A1 * 9/2023 Harutyunyan ........ G06F 18/214 714/37
2023/0367668 A1 * 11/2023 Oglesby .............. G06F 11/0793
2024/0054043 A1 * 2/2024 Chen ................... G06F 11/0709
2024/0143666 A1 * 5/2024 Grushka ............... G06F 16/907
2024/0176878 A1 * 5/2024 Patankar ............... G06F 21/554

* cited by examiner

700

| | |
|---|---|
| Process: **fxpc(fxpc)** | PID: **17945**<br>Avg CPU: **22%** |
| Process: **sh** | PID: **68174**<br>Avg CPU: **6%**<br>Sh process is consuming high CPU. You can terminate the process using PID above |
| Process: **authd** | PID: **18421**<br>Avg CPU: **2%** |
| Process: **rand_harvestq** | PID: **16**<br>Avg CPU: **1%** |

FIG. 7

AUTODETECTION AND REMEDIATION OF HIGH PROCESSOR USAGE AT NETWORK DEVICES

This application claims the benefit of IN Provisional Patent Application No. 202341056781, filed 24 Aug. 2023, the entire contents of which is incorporated herein by reference.

TECHNICAL FIELD

The disclosure relates generally to computer networks and, more specifically, to monitoring and troubleshooting computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. In the case of a client device running a cloud-based application, such as voice over Internet Protocol (VOIP) applications, streaming video applications, gaming applications, or video conference applications, data is exchanged during an application session from the client device through one or more APs and one or more wired network devices, e.g., switches, routers, and/or gateway devices, to reach the cloud-based application server.

SUMMARY

In general, this disclosure describes techniques for detecting high processor usage, such as high central processing unit (CPU) usage, at network devices of a network and to remediate the detected high processor usage at the network devices. High processor usage may impact the routing efficiency of a network device. For example, high processor usage may degrade the expected execution of routing system processes by the processor, such as by delaying execution of routing system processes or by not executing routing system processes. When routing system processes are delayed in being executed by the processor of a network device or are not executed by the processor of a network device, the network device, as well as other network devices directly connected to the network device, may react as if there was a network problem and may cause failover or even catastrophic failure of a site of the network.

The network devices of the network may include switches, routers, gateways, or other suitable network devices that may send and receive network traffic. The network may include up to tens of thousands of network devices and, at any time, hundreds or thousands of the network devices may exhibit issues with routing network traffic. As such, it may be time consuming or even impracticable for network administrators of the network to be able to manually determine which of the network devices exhibiting issues with routing network traffic are impacted by high processor usage and to manually perform remedial actions to address the high processor usage of those network devices.

In accordance with aspects of this disclosure, a cloud-based network management system (NMS) may monitor processor usage statistics of network devices in a network, including processor usage statistics of processes executing at the network devices of the network to detect high processor usage at one or more network devices. The NMS may use the collected processor usage statistics at each of the network devices exhibiting high processor usage to determine whether the high processor usage is caused by anomalous behavior, such as high processor usage by one or more processes executing at the processor. The NMS may invoke one or more remedial actions to address anomalous behavior at each of the one or more network devices having high processor usage caused by anomalous behavior. Such remedial actions may be assigned based on root cause analysis of the processes causing the anomalous behavior. For example, the NMS may automatically terminate one or more processes executing at the processor that are the root cause of the high processor usage. In some examples, the NMS may also recommend one or more remedial actions to a network administrator to address the anomalous behavior that is causing the high processor usage. In some examples, remedial actions are also assigned severity scores based on the duration and magnitude of the high processor usage.

The techniques of the disclosure provide one or more technical advantages and practical applications. The techniques may enable the cloud-based NMS to systematically detect high processor usage of network devices in a network that may be caused by anomalous behavior of the network devices, determine the root causes of the high processor usage, and to automatically take actions to remediate the anomalous behavior of the network devices. The techniques may therefore reduce the amount of time during which network devices experiencing high processor CPU usage may degrade the performance of the network, thereby improving the performance and reliability of the network.

In some aspects, the techniques described herein relate to a network management system including: a memory; and one or more processors coupled to the memory and configured to: obtain processor usage statistics of one or more network devices; determine, for a given network device of the one or more network devices, aggregate processor usage statistics across a time window based on the processor usage statistics; based on an aggregate overall processor usage for the given network device exceeding a baseline threshold, analyze aggregate per-process processor usage for the given network device to determine one or more processes as a root cause of anomalous behavior of the given network device; and generate a remedial action to remediate the root cause.

In some aspects, the techniques described herein relate to a method including: obtaining, by one or more processors of a network management system, processor usage statistics of one or more network devices; determining, by the one or more processors and for a given network device of the one or more network devices, aggregate processor usage statistics across a time window based on the processor usage statistics; based on an aggregate overall processor usage for a given network device exceeding a baseline threshold, analyzing, by the one or more processors, aggregate per-process processor usage for the given network device to determine one or more processes as a root cause of anomalous behavior of the given network device; and generating, by the one or more processors, a remedial action to remediate the root cause.

In some aspects, the techniques described herein relate to a non-transitory computer readable storage media including instructions that, when executed by one or more processors of a network management system, cause the one or more processors to: obtain processor usage statistics of one or more network devices; determine, for a given network device of the one or more network devices, aggregate processor usage statistics across a time window based on the processor usage statistics; based on an aggregate overall processor usage for the given network device exceeding a baseline threshold, analyze aggregate per-process processor usage for the given network device to determine one or more processes as a root cause of anomalous behavior of the given network device; and generate a remedial action to remediate the root cause.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 7 illustrates an example graphic user interface that provides a view of the processor usage of processes at a network device.

Like reference characters refer to like elements throughout the figures and description.

DETAILED DESCRIPTION

Figure 1A:
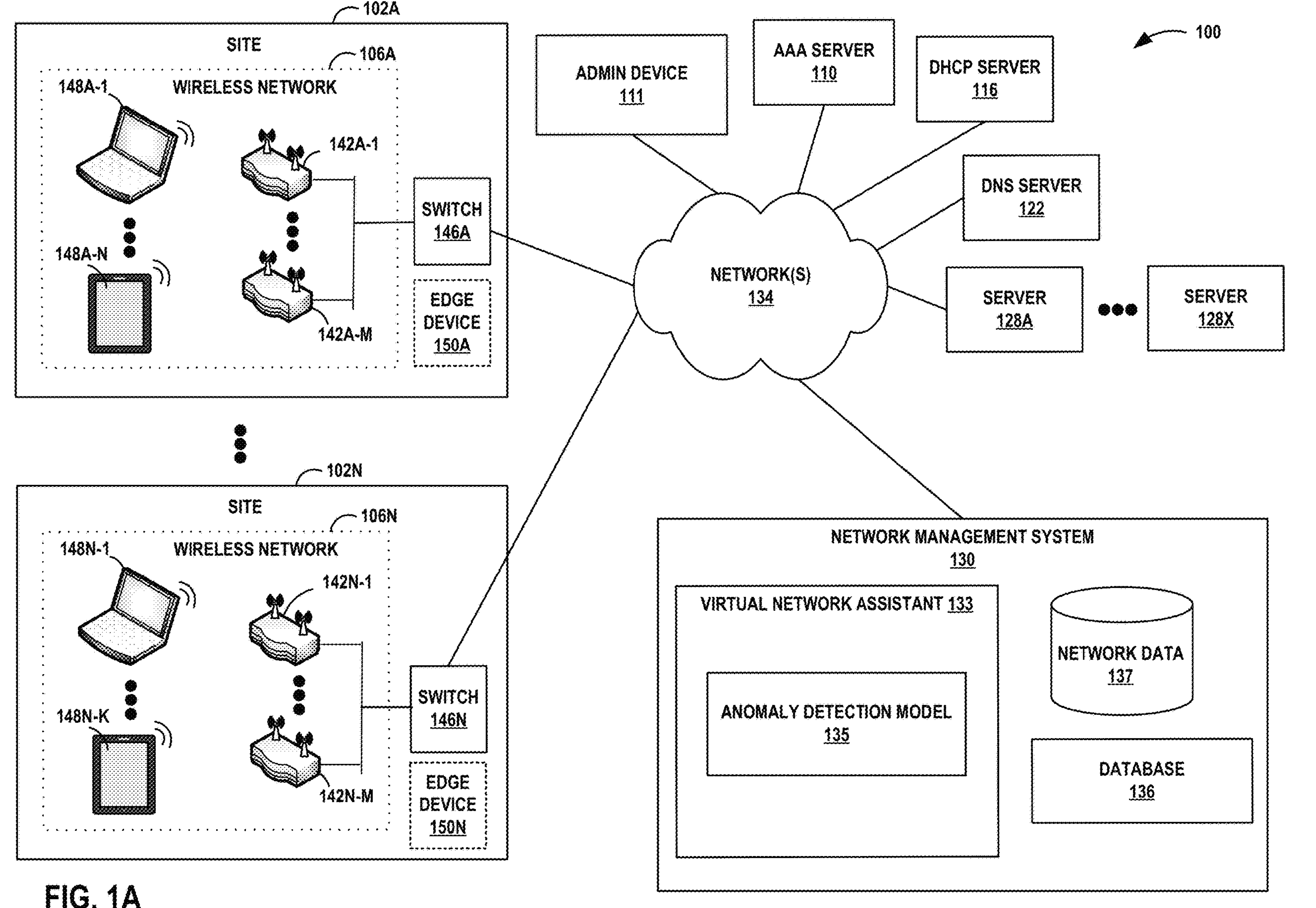
FIG. 1A is a block diagram of an example network system including a network management system, in accordance with one or more techniques of the disclosure.

FIG. 1A is a block diagram of an example network system 100 including network management system (NMS) 130, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices, such as access points (APs) 142, switches 146, or routers (not shown). For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to a wired network and is capable of providing wireless network access to client devices within the site.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) via physical cables, e.g., Ethernet cables. In the example of FIG. 1A, site 102A includes a switch 146A to which each of APs 142A-1 through 142A-M at site 102A are connected. Similarly, site 102N includes a switch 146N to which each of APs 142N-1 through 142N-M at site 102N are connected. Although illustrated in FIG. 1A as if each site 102 includes a single switch 146 and all APs 142 of the given site 102 are connected to the single switch 146, in other examples, each site 102 may include more or fewer switches and/or routers. In addition, the APs and the other wired client-side devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and a network management system (NMS) 130. As shown in FIG. 1A, the various devices and systems of network system 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the NAS devices, e.g., APs 142, switches 146, or routers, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics.

Each one of the network devices of network system 100, e.g., servers 110, 116, 122 and/or 128, APs 142, UEs 148, switches 146, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 110, 116, 122 and/or 128, APs 142, UEs 148, and switches 146, may be considered "third-party" network devices when owned by and/or associated with a different entity than NMS 130 such that NMS 130 does not receive, collect, or otherwise have access to the recorded status and other data of the third-party network devices. In some examples, edge devices 150 may provide a proxy through which the recorded status and other data of the third-party network devices may be reported to NMS 130.

In some examples, NMS 130 monitors network data 137, e.g., one or more service level expectation (SLE) metrics, received from wireless networks 106A-106N at each site 102A-102N, respectively, and manages network resources, such as APs 142 at each site, to deliver a high-quality wireless experience to end users, IoT devices and clients at the site. For example, NMS 130 may include a virtual network assistant (VNA) 133 that implements an event processing platform for providing real-time insights and simplified troubleshooting for IT operations, and that automatically takes corrective action or provides recommendations to proactively address wireless network issues. VNA 133 may, for example, include an event processing platform configured to process hundreds or thousands of concurrent streams of network data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In operation, NMS 130 observes, collects and/or receives network data 137, which may take the form of data extracted from messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In accordance with one or more techniques of this disclosure, NMS 130 is configured to monitor the processor usage, such as the central processing unit (CPU) usage, of each of one or more of network devices, such as switches 146, in network 134. NMS 130 is configured to periodically collect (e.g., every minute, every 3 minutes, etc.) processor usage statistics, such as CPU usage statistics, from each of one or more of switches 146. NMS 130 is configured to use the collected processor usage statistics to detect high processor usage (e.g., high CPU usage) at the one or more of switches 146 and to remediate the detected high processor usage at the one or more of switches 146.

NMS 130 is configured to collect both overall processor usage statistics (e.g., overall CPU usage statistics) of each of the one or more of switches 146 as well as per-process processor usage (e.g., per-process CPU usage statistics) of each of the one or more of switches 146. Collecting per-process processor usage statistics of each of the one or more of switches 146 may enable NMS 130 to determine the root causes of high processor usage of a particular network switch and to determine remedial actions to address the high processor usage of the particular network switch.

The operating system of a network switch may track processor usage of the network switch, which may include the overall processor usage of the network switch as well as per-process processor usage of the network switch. The operating system of the network switch may determine, based on the processor usage of the network switch, processor usage statistics of the network switch, and may expose the tracked processor usage statistics of the network switch. For example, the operating system of the network switch may determine overall processor usage statistics, which may be the overall percentage utilization of the processor, and may determine per-process processor usage statistics, which may be, for each process executing at the processor, the percentage utilization of the processor by the process. An agent executing at the network switch may periodically read the processor usage statistics from the operating system and may periodically send, to NMS 130, the processor usage statistics of the network switch for storage in database 136. The agent may also periodically collect other statistics, such as the amount of network traffic being routed via the network switch, and may periodically send such collected statistics to NMS 130 for storage in database 136.

NMS 130 is configured to determine, for each of one or more of switches 146, whether the network switch is experiencing high CPU usage based at least in part on the processor usage statistics of the network switch collected by NMS 130. In examples where switches 146 may each include multiple modules and/or chasses, NMS 130 is configured to determine, for the lead module and/or chassis of each of switches 146, whether the network switch is experiencing high processor usage based at least in part on the processor usage statistics of the network switch collected by NMS 130.

NMS 130 is configured to determine, for each of one or more of switches 146, aggregate processor usage statistics across a time window. The time window may be the previous 20 minutes, previous 30 minutes, previous hour, and the like. The aggregate processor usage statistics for a network switch across the time window may include a count of the times within the time window that the overall processor usage of the network switch exceeds a specified high processor usage threshold (e.g., 90% utilization), the average (e.g., mean) overall processor usage of the network switch within the time window, and the average processor usage of each process executing at the processor during the time window.

NMS 130 is configured to determine, for each of the one or more of switches 146, whether the overall processor usage of the network switch across the time window exceeds a baseline processor usage threshold. In some examples, the baseline threshold may be a specified percentage of processor utilization, such as 80% CPU utilization. In some examples, the baseline processor usage threshold may be a long-term learned threshold that is specific to a particular network switch and that may be based on tracking the historical processor usage of the particular network switch. NMS 130 is also configured to determine, for each of the one or more of switches 146, whether the count of times within the time window that the overall processor usage of the network switch exceeds the specified high processor usage threshold is greater than a high processor usage frequency threshold, which may be 2, 3, and the like.

NMS 130 is configured to, based on the overall processor usage of a network switch across the time window exceeding the baseline threshold, analyze the aggregate processor usage statistics for the network switch across the time window to detect anomalous behavior. That is, if NMS 130 determines that the processor usage of a network switch is high across the time window, NMS 130 may determine whether such high processor usage is caused by anomalous behavior. For example, NMS 130 may be configured to detect, for each network switch having an overall processor usage of the network switch across the time window that exceeds a baseline processor usage threshold and having a count of times within the time window that the overall processor usage of the network switch exceeds the specified high processor usage threshold that is greater than a high processor usage frequency threshold, anomalous behavior that may be a root cause of the high processor usage.

To detect anomalous behavior for a network switch, NMS 130 may determine the total network traffic routed via the network switch during the time window and the per-process processor usage of processes at the network switch across the time window. NMS 130 may be configured to retrieve network traffic statistics for the network switch that were collected and stored in database 136 and to determine, based on the network traffic statistics for the network switch, the total network traffic routed via the network switch during the time window.

To determine the per-process processor usage of processes at the network switch across the time window, NMS 130 is configured to determine, for the network switch, the processes that execute at the processor during the time window and the processor usage of each of the processes that execute at the processor during the time window. Determining the per-process processor usage of processes at the network switch across the time window may enable NMS 130 to determine which processes are contributing to the high processor usage of the network switch. Determining the per-process processor usage of processes at the network switch across the time window may also enable NMS 130 to determine processor usage anomalies at the process level based on normal usage for the processes and to use mutual information to determine how frequently these anomalies occur per process.

NMS 130 may be configured to use anomaly detection model 135 to perform heuristic-based detection of anomalous behavior that is the root cause of high processor usage of a network switch. In some examples, the anomaly detection model 135 may be trained via machine learning to perform heuristic-based detection of anomalous behavior that is the root cause of high processor usage. Anomalous behavior that is the root cause of high processor usage may be behavior of the network switch, other than high network traffic routed via the network switch, that is the cause of the high processor usage. Such anomalous behavior may include one or more processes executing at the processor that have high processor usage or not deploying the network switch in the recommended manner.

The anomaly detection model 135 may be a statistic model that analyzes long term statistics of overall processor usage of a network switch as well as processor usage by individual processes executing at the processor to detect anomalies at the network switch. The anomaly detection model 135 may be fine-tuned using mutual information and anomaly detection to find commonalities between processes that cause issues at network switches. The anomaly detection model 135 may also be programmed or trained to determine which issues may result from certain processes taking more processor cycles than normal. The anomaly detection model 135 may therefore be able to determine which of the detected anomalies are true positions and/or false positives for certain issues, and to determine remedial actions can be performed for the certain issues.

NMS 130 may input, into the anomaly detection model 135, processor usage statistics of a network switch and/or network traffic statistics of the network switch, and the anomaly detection model 135 may determine and output, based on the inputted data, an indication of whether anomalous behavior is a root cause of high processor usage and/or one or more features that are most relevant to the anomalous behavior. In some examples, NMS 130 may input, into the anomaly detection model 135, features that include processor usage statistics of a network switch and/or network traffic statistics of the network switch and to output an indication of whether anomalous behavior is a root cause of high processor usage and one or more features that are most relevant to the anomalous behavior. The processor usage statistics may include aggregate processor usage statistics across the time window, such as a count of the times within the time window that the overall processor usage of the network switch exceeds a specified high processor usage threshold, the average overall processor usage of the network switch within the time window, and/or the average processor usage of each process executing at the processor during the time window. The processor usage statistics may also include the per-process processor usage of processes at the network switch across the time window. The network traffic statistics of the network switch may include the total network traffic routed via the network switch during the time window.

The anomaly detection model 135 may output an indication of whether anomalous behavior is a root cause of high processor usage and/or one or more features that are most relevant to the anomalous behavior. For example, the anomaly detection model 135 may determine, based on the inputted features, an anomaly score, which may be between 0 and 1, that may correspond to the probability that the high processor usage of the network switch is caused by anomalous behavior that has been detected by the anomaly detection model 135. If the anomaly score is higher than an anomaly score threshold, such as 0.6 in the example where the anomaly score is between 0 and 1, NMS 130 may determine that the high processor usage of the network switch is caused by anomalous behavior that has been detected by the anomaly detection model 135.

If NMS 130 determines that the high processor usage of the network switch is caused by anomalous behavior that has been detected by the anomaly detection model 135, NMS 130 may be configured to store the determined processor usage statistics and determined network traffic statistics for the network switch in database 136. Such processor usage statistics and network traffic statistics for the network switch may be used by NMS 130 in future time windows to more accurately detect anomalous behavior of the network switch and/or to correlate the determined processor usage statistics and network traffic statistics of the network switch with the processor usage statistics and network traffic statistics of the network switch in future time windows using exponential averaging.

If NMS 130 determines that the high processor usage of the network switch is caused by anomalous behavior that has been detected by the anomaly detection model, anomaly detection model 135 may also output one or more features that are determined to be the most relevant to the detected anomalous behavior at the network switch. For example, the anomaly detection model 135 may be able to detect whether the network switch has been deployed in the recommended manner. A network switch that has not been deployed in the recommended manner (e.g., by using non-certified optical connectors or other physical components) may result in sub-optimal usage of the network switch and may be the cause of high processor usage of the network switch. As such, if the anomaly detection model 135 detects that the network switch has not been deployed in the recommended manner, the anomaly detection model 135 may output an indication that the anomalous behavior is caused by the network switch not being deployed in the recommended manner.

In some examples, NMS 130 is configured to use the anomaly detection model 135 to determine one or more processes as a root cause of the anomalous behavior of a network switch. In some examples, the anomaly detection model 135 may be able to detect that high processor usage of the network switch is caused by one or more processes executing at the processor of the network switch and may, in response, output an indication of one or more processes executing at the processor that are the root cause of the anomalous behavior.

Processes that utilize the processor of a network switch may include user space processes and system space processes. As such, the anomaly detection model 135 may output an indication of one or more user space processes and/or one or more system space processes that are the root cause of the anomalous behavior.

In some examples, user space processes that do not appear to have a high usage of the processor may nonetheless be the root cause of high processor usage by system space processes, such as if a user space process causes a large number of system space processes to launch and execute at the processor. The anomaly detection model 135 may be programmed and/or trained to associate user space processes of the network switch with system space processes that the user space process may cause to launch, and therefore may be able to detect and output an indication that a user space process is the root cause of high processor usage of a network switch even if the user space process does not have high usage of the processor.

NMS 130 may, in response to determining one or more processes as a root cause of the anomalous behavior of a network switch, generate a remedial action in response to the root cause of the anomalous behavior. In some examples, NMS 130 may be configured to automatically invoke one or more remedial actions to address the root cause of the anomalous behavior. For example, if the anomaly detection model detects that a certain user space process executing at the processor of a network switch is the root cause of high processor usage of the network switch, NMS 130 may be configured to auto-terminate the user space process or to restart the user space process to resolve the high processor usage.

In some examples, NMS 130 may be configured to generate and output notifications, e.g., to the network administrator of the WAN, with recommendations to perform one or more remedial actions to address the anomalous behavior. For example, NMS 130 may generate data representative of a user interface for display on a user interface device, e.g., operated by a network administrator of the enterprise network, that presents the recommendations to perform one or more remedial actions. In some examples, NMS 130 may output indications of remedial actions and recommended actions in the form of a chat bot that may be searchable by users, such as the system administrator of the WAN.

For example, if NMS 130 determines that the anomalous behavior is caused by the network switch not being deployed in the recommended manner (e.g., by using non-certified optical connectors or other physical components), NMS 130 may be configured to generate and output a recommended remedial action to use certified optical connectors or physical components. In another example, if the anomaly detection model detects that a certain system space process executing at the processor of a network switch is the root cause of high processor usage of the network switch, NMS 130 may be configured to generate and output a recommended remedial action to terminate or restart the system space process. In some examples, if such a system space process has been whitelisted for termination or for restarting by NMS 130, NMS 130 may be configured to auto-terminate the system space process or to restart the system space process to resolve the high processor usage.

While the techniques of this disclosure are described with respect to detecting high CPU usage of network switches, the techniques described herein may similarly be applied to detecting high memory usage of network switches and/or high temperature of network switches. Further, while the techniques of this disclosure are described with respect to network switches, the techniques described herein may similarly be applied to routers, access points, and any other suitable network device in a network.

The techniques of the disclosure provide one or more technical advantages and practical applications. The techniques may enable the cloud-based NMS 130 to systematically detect high processor usage of switches 146 in a network that may be caused by anomalous behavior of the switches 146 and to take actions to remediate the anomalous behavior of the network switches.

In addition, NMS 130 may provide user visibility into anomalous behavior of network switches 146 in a network. For example, NMS 130 may generate data representative of a user interface for display on a user interface device, e.g., operated by a network administrator of the enterprise network. The user interface may present indications of anomalous behavior of switches 146 that are the root cause of high processor usage by the switches 146. NMS 130 may further generate and output notifications, e.g., to the network administrator of the enterprise network, with recommendations to perform one or more remedial actions to address the root cause of the high processor usage by the switches 146. In other examples, NMS 130 may instead automatically invoke the one or more remedial actions to address the anomalous behavior, such as automatically terminating one or more processes at the switches 146 that are causing the high processor usage.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network system 100, and may or may not form a part of NMS 130.

Figure 1B:
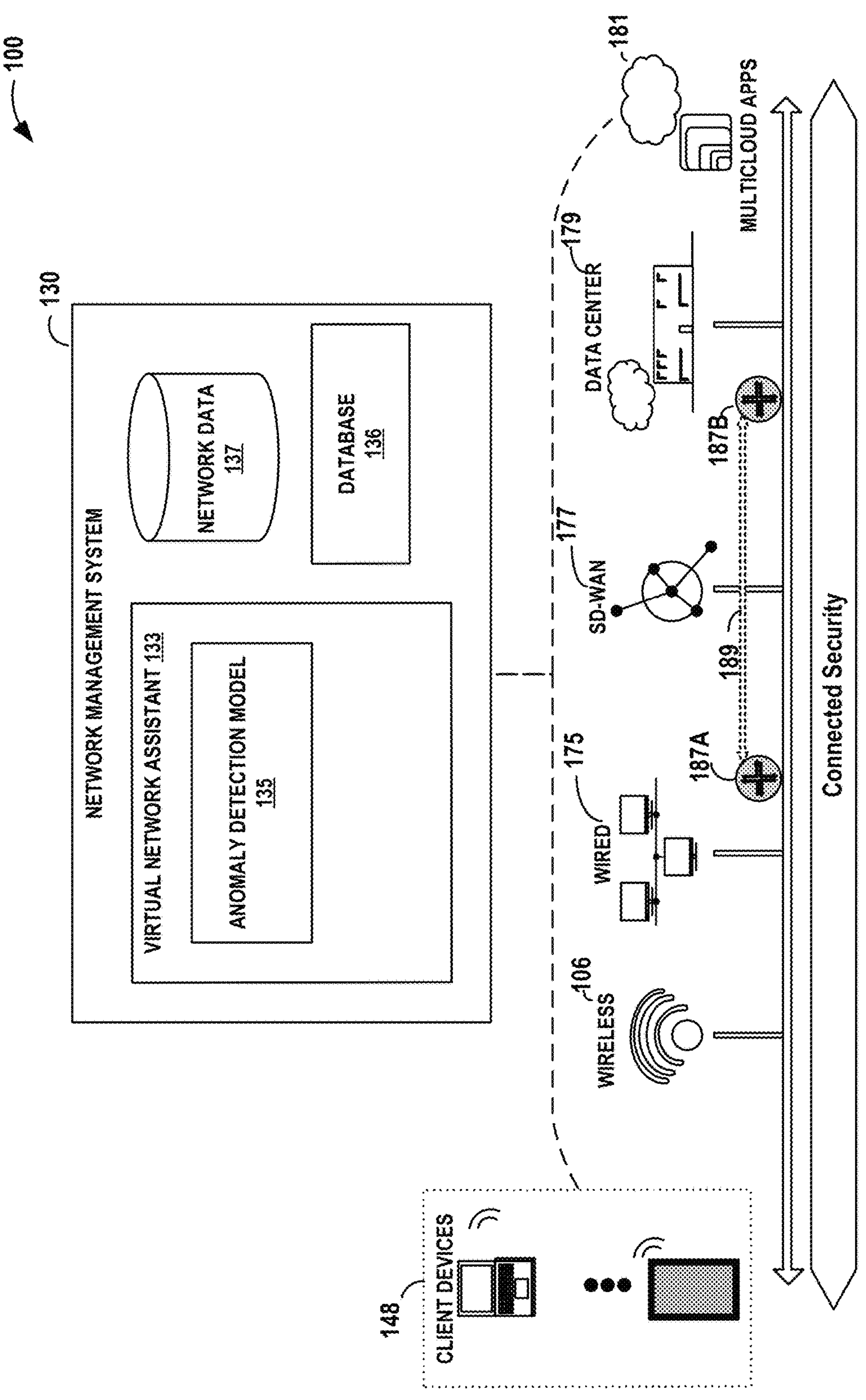
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from "client," e.g., user devices 148 connected to wireless network 106 and wired LAN 175 (far left of FIG. 1B), to "cloud," e.g., cloud-based application services 181 that may be hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network system 100 so as to provide self-driving capabilities. Moreover, VNA 133 includes a natural language processing engine to provide AI-driven support and troubleshooting, anomaly detection, AI-driven location services, and AI-driven radio frequency (RF) optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by client devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 includes virtual network assistant 133 configured to monitor the CPU usage of network devices. The CPU usage agent may periodically collect CPU usage statistics from network devices to determine high network usage at one or more of the network devices. NMS 130 may also include anomaly detection model 135 configured to determine whether such high CPU usage is caused by anomalous behavior. NMS 130 may therefore determine and/or automatically perform remedial actions can be performed to ameliorate such anomalous behavior.

Figure 2:
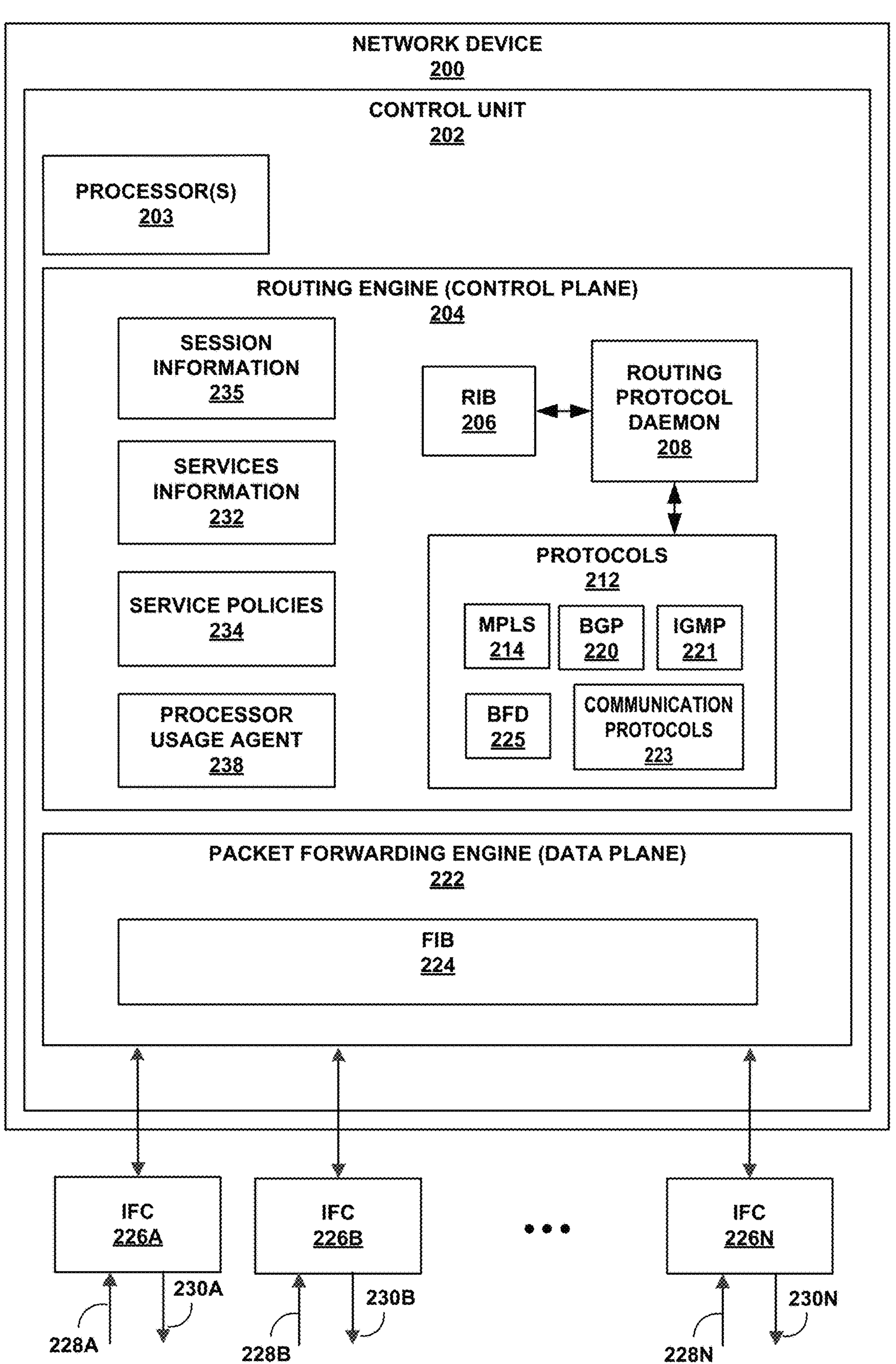
FIG. 2 is a block diagram illustrating an example network device in accordance with the techniques of the disclosure.

FIG. 2 is a block diagram illustrating an example network device 200 in accordance with the techniques of the disclosure. In general, network device 200 may be an example of one of switches 146 of FIG. 1A, one of routers 187A, 187B of FIG. 1B, or another network device supporting one or more of wireless network 106, wired LAN 175, or SD-WAN 177, or data center 179 of FIG. 1B, e.g., routers 187. In this example, network device 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 200 also includes a control unit 202 that determines routes of received packets and forwards the packets accordingly via IFCs 226.

Control unit 202 may comprise one or more processor(s) 203, routing engine 204 and packet forwarding engine 222. Processor(s) 203 may implement functionality and/or execute instructions within network device 200 to implement the functionality of network device 200. For example, processor(s) 203 execute software instructions, such as those used to define a software or computer program, stored to a computer-readable storage medium, such as non-transitory computer-readable mediums including a storage device (e.g., a disk drive, or an optical drive) or a memory (such as Flash memory or RAM) or any other type of volatile or non-volatile memory, not including transitory computer-readable media such as a carrier wave or a transitory propagating signal, that stores instructions to cause the one or more processors 203 to perform the techniques described herein. In the example of FIG. 2, processor(s) 203 may be referred to as the CPU of network device 200.

Routing engine 204 operates as the control plane for network device 200 and includes an operating system that provides a multi-tasking operating environment for execution of a number of concurrent processes. Routing engine 204 communicates with other routers, e.g., such as switches 146 of FIG. 1A, to establish and maintain a computer network, such as network system 100 of FIGS. 1A-1B, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols 223, such as TCP, UDP, TLS, or ICMP. Protocols 212 may also include one or more performance monitoring protocols, such as BFD 225.

RIB 206 may describe a topology of the computer network in which network device 200 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from a client device, e.g., source device 112A of FIG. 1A, and destined for another client device, e.g., destination device 114 of FIG. 1A, routing engine 204 determines whether the packet belongs to a new session (e.g., is the "first" packet or "lead" packet of a session). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In some examples, network device 200 may comprise a session-based router that employs a stateful, session-based routing scheme that enables routing engine 204 to independently perform path selection and traffic engineering. The use of session-based routing may enable network device 200 to eschew the use of a centralized controller, such as an SDN controller, to perform path selection and traffic engineering, and eschew the use of tunnels. In some examples, network device 200 may implement session-based routing as Secure Vector Routing (SVR), provided by Juniper Networks, Inc. In the case where network device 200 comprises a session-based router operating as a network gateway for a site of an enterprise network, network device 200 may establish multiple peer paths over an underlying physical WAN with one or more other session-based routers operating as network gateways for other sites of the enterprise network.

Although primarily described herein as a session-based router, in other examples, network device 200 may comprise a network switch or may comprise packet-based router in which routing engine 204 employs a packet- or flow-based routing scheme to forward packets according to defined network paths, e.g., established by a centralized controller that performs path selection and traffic engineering. In the case where network device 200 comprises a packet-based router operating as a network gateway for a site of an enterprise network, network device 200 may establish multiple tunnels over an underlying physical WAN with one or more other packet-based routers operating as network gateways for other sites of the enterprise network.

In accordance with the techniques of the disclosure, processor usage agent 238 of control unit 202 is configured to collect processor usage statistics (e.g., usage statistics of processor(s) 203) of network device 200. Processor usage agent 238 may collect both overall processor usage statistics of processor(s) 203 as well as per-process processor usage statistics of processor(s) 203 and to send the collected processor usage statistics to NMS 130. Processor(s) 203 may be configured to execute processes that may include user space processes and system space processes, and processor usage agent 238 may collect per-process processor usage statistics for both user space processes and system space processes.

The operating system of network device 200 may track processor usage of processor(s) 203, which may include the overall processor usage of processor(s) 203 as well as per-process processor usage of processor(s) 203. The operating system of the network device may determine, based on the processor usage of processor(s) 203, processor usage statistics of processor(s) 203, and may expose the tracked processor usage statistics of processor(s) 203. For example, the operating system of network device 200 may determine overall processor usage statistics, which may be the overall percentage utilization of processor(s) 203, and may determine per-process processor usage statistics, which may be, for each process executing at processor(s) 203, the percentage utilization of processor(s) 203 by the process. Processor usage agent 238 executing at network device 200 may periodically read the processor usage statistics from the operating system and may periodically send, to NMS 130, the processor usage statistics of processor(s) 203. In some examples, processor usage agent 238 may also periodically collect other statistics, such as the amount of network traffic being routed via network device 200, and may periodically send such collected statistics to NMS 130.

Figure 3:
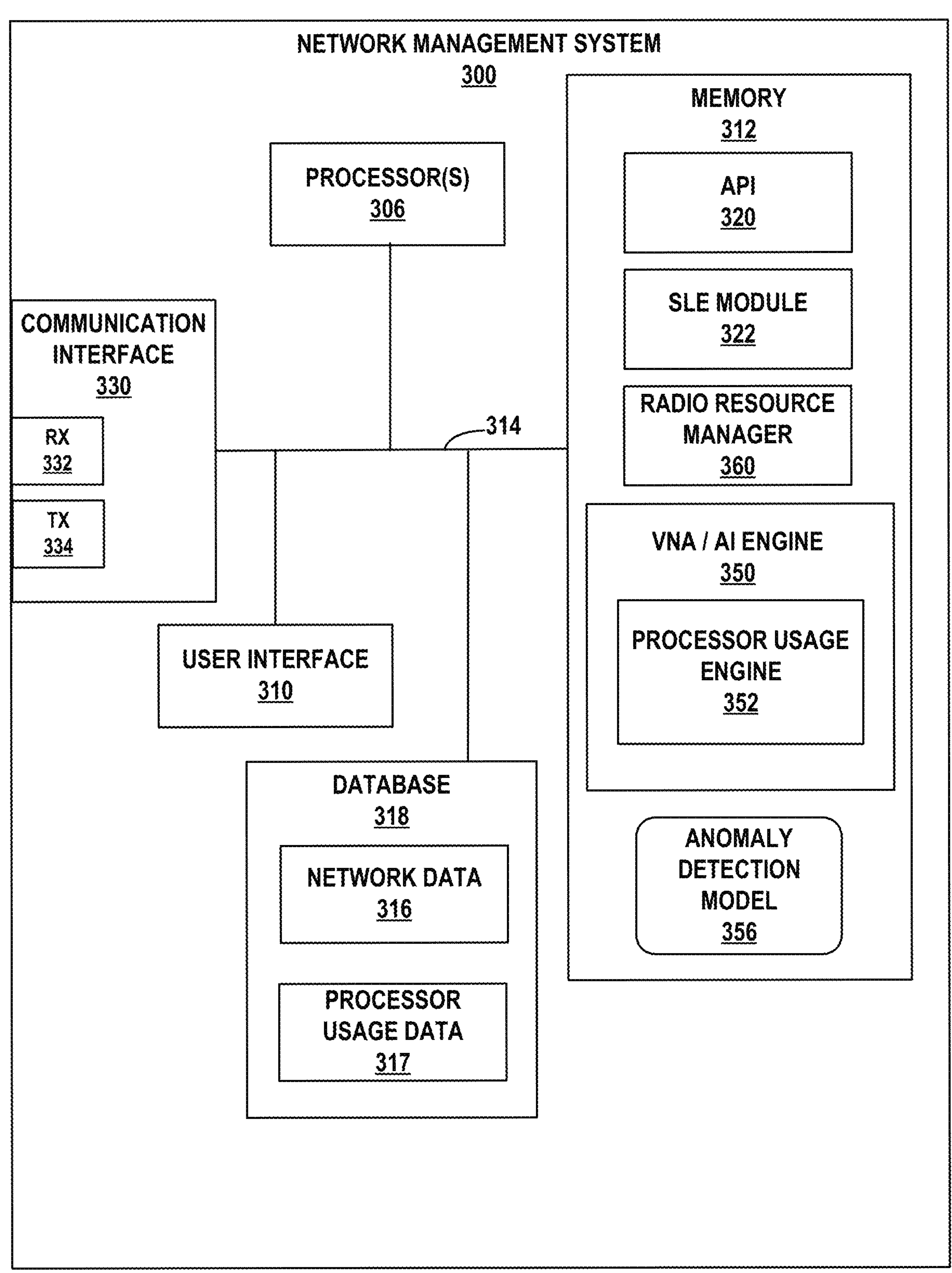
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively.

NMS 300 includes a communications interface 330, one or more processor(s) 306, a user interface device 310, a memory 312, and a database 318. The various elements are coupled together via a bus 314 over which the various elements may exchange data and information. In some examples, NMS 300 receives data from one or more of client devices 148, APs 142, switches 146 and other network nodes within network 134, e.g., routers 187 of FIG. 1B, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, not including transitory computer-readable media such as a carrier wave or a transitory propagating signal, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, servers 110, 116, 122, 128 and/or any other network nodes, devices, or systems forming part of network system 100 such as shown in FIG. 1A. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data, SLE-related data, or event data received from one or more of client device APs 148, APs 142, switches 146, or other network nodes, e.g., routers 187 of FIG. 1B, used by NMS 300 to remotely monitor the performance of wireless networks 106A-106N and application sessions from client device to cloud-based application server. The data and information received by NMS 300 may also include processor usage statistics collected by switches 146, and NMS 300 may store the collected processor usage statistics as processor usage data 317 in database 318. The processor usage statistics may comprise both overall processor usage statistics of each of one or more of switches 146 as well as per-process processor usage statistics of each of the one or more of switches 146. The overall processor usage statistics of a network switch may be the overall percentage utilization of the processor of the network device while the per-process processor usage statistics of a network switch may be, for each process executing at the processor of the network switch, the percentage utilization of the processor by the process. NMS 300 uses the processor usage statistics to determine, for each of the one or more of switches 146, whether the network switch is experiencing high processor usage and whether anomalous behavior of the network switch is caused by high processor usage. NMS 300 may further transmit data via communications interface 330 to any of network devices such as client devices 148, APs 142, switches 146, other network nodes within network 134, admin device 111 to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, not including transitory computer-readable media such as a carrier wave or a transitory propagating signal, that stores instructions to cause the one or more processor(s) 306 to perform the techniques described herein.

In this example, memory 312 includes an API 320, an SLE module 322, a virtual network assistant (VNA)/AI engine 350, and a radio resource management (RRM) engine 360. In accordance with the disclosed techniques, VNA/AI engine 350 includes processor usage engine 352. NMS 300 may also include any other programmed modules, software engines and/or interfaces configured for remote monitoring and management of wireless networks 106A-106N and portions of the wired network, including remote monitoring and management of any of APs 142/200, switches 146, or other network devices, e.g., routers 187 of FIG. 1B.

SLE module 322 enables set up and tracking of thresholds for SLE metrics for each network 106A-106N. SLE module 322 further analyzes SLE-related data collected by APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM engine 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

VNA/AI engine 350 analyzes processor usage data 317, which includes processor usage statistics received from switches 146, as well as its own data to detect high processor usage at one or more of switches 146 and to detect anomalous behavior of one or more of switches 146 caused by high processor usage. For example, VNA/AI engine 350 may use processor usage engine 352 to determine whether anomalous behavior at a network device is caused by high CPU usage at the network device and to determine the root cause of the anomalous behavior. In some examples, processor usage engine 352 utilizes artificial intelligence-based techniques to help determine whether anomalous behavior at a network device is caused by high processor usage at the network device. In addition, VNA/AI engine 350 may automatically invoke one or more corrective actions intended to address anomalous behavior by a network device that is caused by high processor usage. Examples of corrective actions that may be automatically invoked by VNA/AI engine 350 may include, but are not limited to, invoking API 320 to terminate one or more processes determined as a root cause of anomalous behavior of a network device. The corrective actions may further include restarting one or more network devices, invoking download of new software to a network device, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

VNA/AI engine 350 may, in some examples, construct, train, apply and retrain anomaly detection model 356, using supervised and/or unsupervised training, to determine, for a network switch, whether the anomalous behavior of the network switch is caused by high processor usage. VNA/AI engine 350 may then apply the anomaly detection model 356 to data streams and/or logs of newly collected data (e.g., processor usage data 317) of switches 146 to detect whether the currently observed anomalous behavior of a network switch is caused by high processor usage. When the application of the anomaly detection model 356 to processor usage data 317 indicates that anomalous behavior of a network device is due to high processor usage, VNA/AI engine 350 may invoke processor usage engine 352 to trigger automated or semi-automated corrective action.

In some examples, anomaly detection model 356 may comprise a supervised ML model that is trained, using training data comprising pre-collected, labeled network data received from network devices (e.g., client devices, APs, switches and/or other network nodes), to identify anomalous behavior of a network switch. The supervised ML model may comprise one of a logistical regression, naïve Bayesian, support vector machine (SVM), or the like. In other examples, anomaly detection model 356 may comprise an unsupervised ML model. Although not shown in FIG. 3, in some examples, database 318 may store the training data and VNA/AI engine 350 or a dedicated training module may be configured to train anomaly detection model 356 based on the training data to determine appropriate weights across the one or more features of the training data.

In accordance with the techniques of this disclosure, processor usage engine 352 may monitor the processor usage of each of one or more of network devices, e.g., switches 146 in network system 100 of FIG. 1A, such as by monitoring processor usage data 317 of each of one or more of switches 146 collected by NMS 300, to determine, for each of one or more of switches 146, whether the network switch is experiencing high processor usage. In examples where switches 146 may each include multiple modules and/or chasses, processor usage engine 352 may determine, for the lead module and/or chassis of each of switches 146, whether the network switch is experiencing high processor usage. While the techniques are described with respect to switches 146, the techniques may be equally applicable to any other type of network devices.

Processor usage engine 352 may determine, for each of one or more of switches 146, aggregate processor usage statistics across a time window. The time window may be the previous 20 minutes, previous 30 minutes, previous hour, and the like. The aggregate processor usage statistics for a network switch across the time window may include a count of the times within the time window that the overall processor usage of the network switch exceeds a specified high processor usage threshold (e.g., 90% utilization), the average (e.g., mean) overall processor usage of the network switch within the time window, and the average processor usage of each process executing at the processor during the time window.

Processor usage engine 352 may determine, for each of the one or more of switches 146, whether the overall processor usage of the network device across the time window exceeds a baseline processor usage threshold. In some examples, the baseline threshold may be a specified percentage of processor utilization, such as 80% processor utilization. In some examples, the baseline processor usage threshold may be a long-term learned threshold that is specific to a particular network switch and that may be based on tracking the historical processor usage of the particular network switch. In some examples, the baseline threshold may be determined based on statistics from a large sample set of network switches, and may be a universal baseline threshold for network devices. Processor usage engine 352 may also determine, for each of the one or more of switches 146, whether the count of times within the time window that the overall processor usage of the network device exceeds the specified high processor usage threshold is greater than a high processor usage frequency threshold, which may be 2, 3, and the like.

Processor usage engine 352 may, based on the overall processor usage of a network switch across the time window exceeding the baseline threshold, analyze the aggregate processor usage statistics for the network switch across the time window to detect anomalous behavior. That is, if processor usage engine 352 determines that the processor usage of a network switch is high across the time window, processor usage engine 352 may determine whether such high processor usage is caused by anomalous behavior. For example, processor usage engine 352 may detect, for each network switch having an overall processor usage of the network switch across the time window that exceeds a baseline processor usage threshold and having a count of times within the time window that the overall processor usage of the network switch exceeds the specified high processor usage threshold that is greater than a high processor usage frequency threshold, anomalous behavior that may be a root cause of the high processor usage.

To detect anomalous behavior for a network switch, processor usage engine 352 may determine the total network traffic routed via the network switch during the time window and the per-process processor usage of processes at the network switch across the time window. Processor usage engine 352 may be configured to retrieve network traffic statistics for the network switch that were collected and stored in database 318 and to determine, based on the network traffic statistics for the network switch, the total network traffic routed via the network switch during the time window.

To determine the per-process processor usage of processes at the network switch across the time window, processor usage engine 352 may determine, for the network switch, the processes that were executing at the processor during the time window and the processor usage of each of the processes that were executing at the processor during the time window. Determining the per-process processor usage of processes at the network switch across the time window may enable NMS 300 to determine which processes are contributing to the high processor usage of the network switch. Determining the per-process processor usage of processes at the network switch across the time window may also enable NMS 300 to determine processor usage anomalies at the process level based on normal usage for the processes and to use mutual information to determine how frequently these anomalies occur per process.

Processor usage engine 352 may use anomaly detection model 356 to perform heuristic-based detection of anomalous behavior that is the root cause of high processor usage of a network device. In some examples, anomaly detection model 356 may be trained via machine learning to perform heuristic-based detection of anomalous behavior that is the root cause of high processor usage. Anomalous behavior that is the root cause of high processor usage may be behavior of the network switch, other than high network traffic routed via the network switch, that is the cause of the high processor usage. Such anomalous behavior may include one or more processes executing at the processor that have high processor usage or not deploying the network switch in the recommended manner.

Anomaly detection model 356 may be a statistic model that analyzes long term statistics of overall processor usage of a network switch as well as processor usage by individual processes executing at the processor to detect anomalies at the network switch. In some examples, anomaly detection model 356 may also track overall processor (e.g., CPU) usage and/or processor usage by individual processes across multiple deployments to determine overall distribution of processor usage and firmware-related commonalities in anomalous behavior. Anomaly detection model 356 may be fine-tuned using mutual information and anomaly detection to find commonalities between processes that cause issues at network switches 146. Anomaly detection model 356 may also be programmed or trained to determine which issues may result from certain processes taking more processor cycles than normal. Anomaly detection model 356 may therefore be able to determine which of the detected anomalies are true positives and/or false positives for certain issues, and to determine remedial actions can be performed for the certain issues.

Processor usage engine 352 may input, into anomaly detection model 356, processor usage statistics of a network switch and/or network traffic statistics of the network switch, which may be stored as processor usage data 317, and anomaly detection model 356 may determine and output, based on the inputted data, an indication of whether anomalous behavior of the network switch is a root cause of high processor usage and/or indications of one or more features that are most relevant to the anomalous behavior. In some examples, processor usage engine 352 may input, into anomaly detection model 356, features that include processor usage statistics of a network switch and/or network traffic statistics of the network switch, and anomaly detection model 356 may output an indication of whether anomalous behavior is a root cause of high processor usage and one or more features that are most relevant to the anomalous behavior.

The processor usage statistics inputted into anomaly detection model 356 may include aggregate processor usage statistics across the time window, such as a count of the times within the time window that the overall processor usage of the network switch exceeds a specified high processor usage threshold, the average overall processor usage of the network switch within the time window, and/or the average processor usage of each process executing at the processor during the time window. The processor usage statistics may also include the per-process processor usage of processes at the network switch across the time window. The network traffic statistics of the network switch may include the total network traffic routed via the network switch during the time window.

Anomaly detection model 356 may output an indication of whether anomalous behavior of a network switch is a root cause of high processor usage and/or one or more features that are most relevant to the anomalous behavior. For example, anomaly detection model 356 may determine, based on the inputted features, an anomaly score, which may be between 0 and 1, that may correspond to the probability that the high processor usage of the network switch is caused by anomalous behavior that has been detected by the anomaly detection model. If the anomaly score is higher than an anomaly score threshold, such as 0.6 in the example where the anomaly score is between 0 and 1, processor usage engine 352 may determine that the high processor usage of the network switch is caused by anomalous behavior that has been detected by anomaly detection model 356.

If Processor usage engine 352 determines that the high processor usage of the network switch is caused by anomalous behavior that has been detected by the anomaly detection model 356, processor usage engine 352 may be configured to store the determined processor usage statistics and determined network traffic statistics for the network switch in database 318. Such Processor usage statistics and network traffic statistics for the network switch may be used by NMS 300 and processor usage engine 352 in future time windows to more accurately detect anomalous behavior of the network switch and/or to correlate the determined processor usage statistics and network traffic statistics of the network switch with the processor usage statistics and network traffic statistics of the network switch in future time windows using exponential averaging.

If processor usage engine 352 determines that the high processor usage of the network switch is caused by anomalous behavior that has been detected by anomaly detection model 356, anomaly detection model 356 may also output one or more features that are determined to be the most relevant to the detected anomalous behavior at the network switch. For example, anomaly detection model 356 may be able to detect whether the network switch has been deployed in the recommended manner. A network switch that has not been deployed in the recommended manner (e.g., by using non-certified optical connectors or other physical components) may result in sub-optimal usage of the network switch and may be the cause of high processor usage of the network switch. As such, if anomaly detection model 356 detects that the network switch has not been deployed in the recommended manner, anomaly detection model 356 may output an indication that the anomalous behavior is caused by the network switch not being deployed in the recommended manner.

In some examples, processor usage engine 352 may use anomaly detection model 356 to determine one or more processes as a root cause of the anomalous behavior of a network switch. In some examples, anomaly detection model 356 may be able to detect that high processor usage of the network switch is caused by one or more processes executing at the processor of the network switch and may, in response, output an indication of one or more processes executing at the processor that are the root cause of the anomalous behavior. Processes that utilize the processor of a network switch may include user space processes and system space processes. As such, anomaly detection model 356 may output an indication of one or more user space processes and/or one or more system space processes that are the root cause of the anomalous behavior.

In some examples, user space processes that do not appear to have a high usage of the processor may nonetheless be the root cause of high processor usage by system space processes, such as if a user space process causes a large number of system space processes to launch and execute at the processor. Anomaly detection model 356 may be programmed and/or trained to associate user space processes of the network switch with system space processes that the user space process may cause to launch, and therefore may be able to detect and output an indication that a user space process is the root cause of high processor usage of a network switch even if the user space process does not have high usage of the processor.

Processor usage engine 352 may, in response to determining one or more processes as causing high processor usage that is a root cause of the anomalous behavior of a network switch, generate a remedial action in response to the root cause of the anomalous behavior. In some examples, processor usage engine 352 may automatically invoke one or more remedial actions to address the root cause of the anomalous behavior. For example, if the anomaly detection model 356 detects that a certain user space process executing at the processor of a network switch is the root cause of high processor usage of the network switch, processor usage engine 352 may auto-terminate the user space process or to restart the user space process to resolve the high processor usage.

In some examples, processor usage engine 352 may generate and output notifications, e.g., to the network administrator of the WAN, with recommendations to perform one or more remedial actions to address the anomalous behavior. For example, processor usage engine 352 may generate data representative of a user interface for display on a user interface device, e.g., operated by a network administrator of the enterprise network, that presents the recommendations to perform one or more remedial actions. In some examples, processor usage engine 352 may output indications of remedial actions and recommended actions in the form of a chat bot that may be searchable by users, such as the system administrator of the WAN.

For example, if processor usage engine 352 determines that the anomalous behavior is caused by the network switch not being deployed in the recommended manner (e.g., by using non-certified optical connectors or other physical components), NMS 300 may generate and output a recommended remedial action to use certified optical connectors or physical components. In another example, if anomaly detection model 356 detects that a certain system space process executing at the processor of a network switch is the root cause of high processor usage of the network switch, NMS 300 may generate and output a recommended remedial action to terminate or restart the system space process. In some examples, if such a system space process has been whitelisted for termination or for restarting by NMS 300, NMS 300 may auto-terminate the system space process or to restart the system space process to resolve the high processor usage.

An example of the technique performed by NMS 300, processor usage engine 352, and anomaly detection model 356, as describe herein, is presented below:

1. In current batch, read overall CPU usage and per process CPU usage data from cloud for every switch module.
2. Aggregate CPU stats over a 20 minute time window for each module:
   a. Count of CPU>threshold1 (90%)=counter1;
   b. Average CPU usage per-module=avg_cpu; and
   c. Average CPU usage per-process per-module=avg_process_cpu.
3. If counter1>2 (2 high CPU points) and avg_cpu>threshold2 (80% or long-term learned baseline):
   d. Compute total network traffic routing via switch in current aggregation window; and
   e. Compute average CPU usage per-process coinciding with high CPU points.

4. Input the features from steps (2) and (3) into anomaly detection model.
5. The output of anomaly detection model includes an anomaly score (between 0-1) of the high CPU event and the most relevant features.
6. If anomaly score is >threshold3 (0.6):
   f. Save counter1, avg_cpu and avg_process_cpu to cloud database; and
   g. Generate an action for user intervention or auto-remediate by termination of root cause process from cloud.
7. In the next batch, perform steps (1)-(6) and correlate the results with features of the previous batch using exponential averaging.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network system 100, and may or may not form a part of NMS 130.

Figure 4:
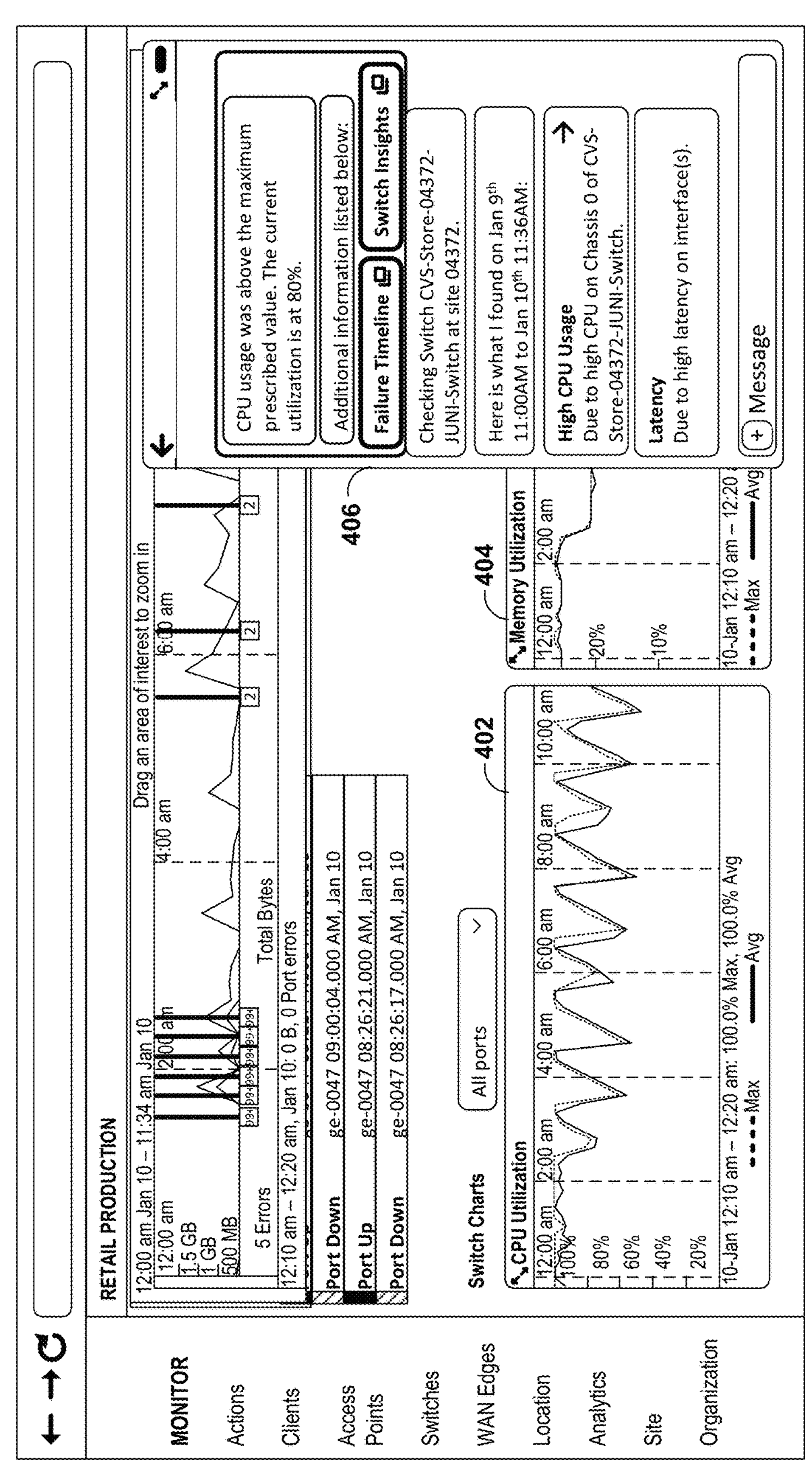
FIG. 4 illustrates an example graphic user interface that provides a view of the processor usage of network devices.

FIG. 4 illustrates an example graphic user interface that provides a view of the processor usage of network devices. FIG. 4 is described with respect to FIGS. 1-3. A network management system, such as network management system 300, may generate data representative of a graphical user interface for display on a user interface device (e.g., user interface device 310), which may be operated by a network administrator of the enterprise network.

As shown in FIG. 4, NMS 300 may output graphical user interface (GUI) 400 for display at, e.g., user interface device 310, that presents a visualization of the processor usage 402 and the memory usage 404 of a network device (e.g., one of switches 146) in network system 100. GUI 400 also presents notifications 406 that may be outputted by NMS 300, such as a notification that the processor usage of the network device is above a prescribed maximum processor usage threshold.

Figure 5:
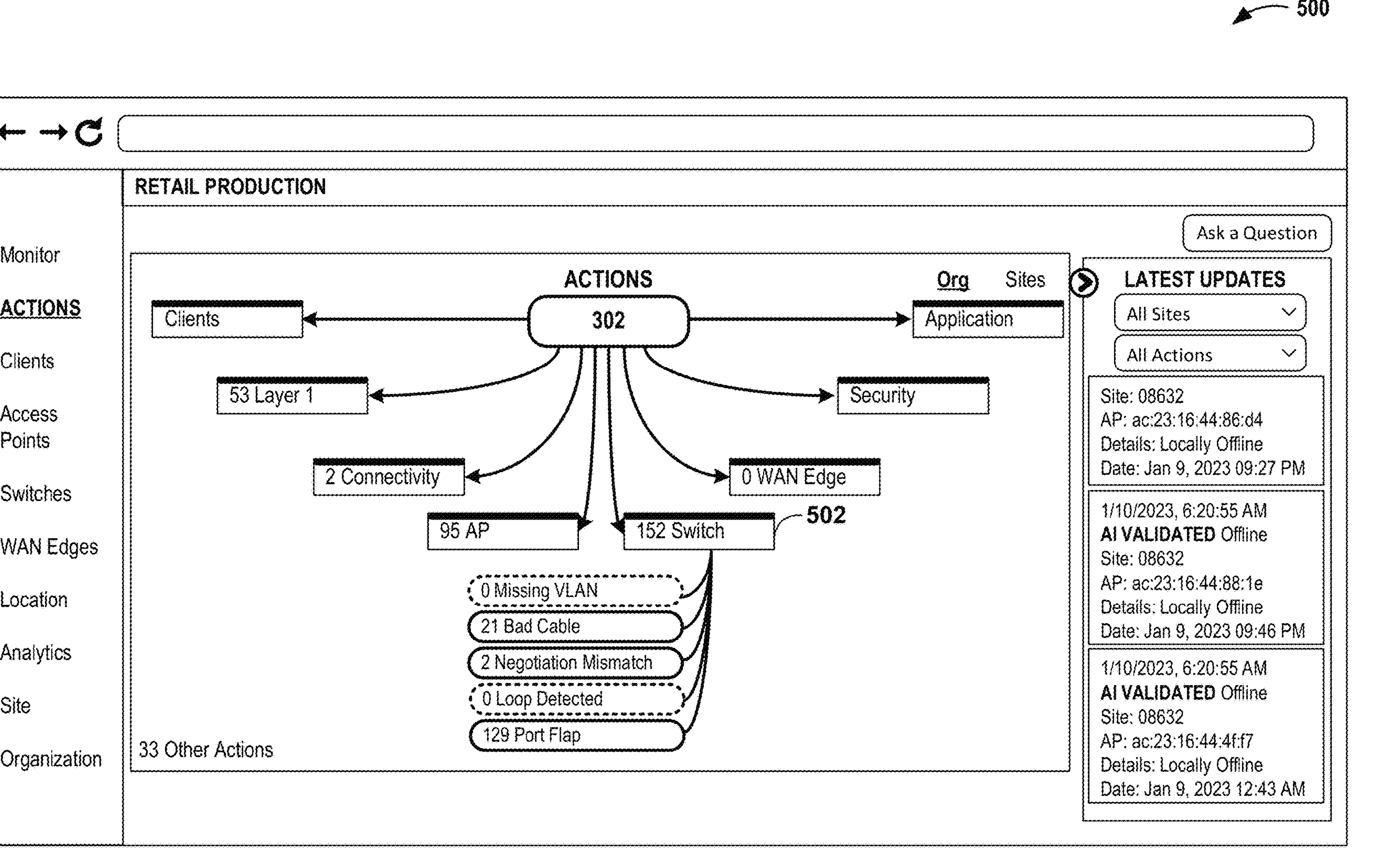
FIG. 5 illustrates an example graphic user interface that provides a view of the root cause of network issues.

FIG. 5 illustrates an example graphic user interface that provides a view of the root cause of network issues. FIG. 5 is described with respect to FIGS. 1-3. A network management system, such as network management system 300, may generate data representative of a graphical user interface for display on a user interface device (e.g., user interface device 310), which may be operated by a network administrator of the enterprise network.

As shown in FIG. 5, NMS 300 may output graphical user interface (GUI) 500 for display at, e.g., user interface device 310, to present indications of network issues (e.g., issues in network system 100) and indications of root causes of the network issues. For example, GUI 500 may present a view of root causes of issues of network switch 502, such as missing VLAN, bad cable, negotiation mismatch, loop detection, port flap, port stuck (not shown in FIG. 5), or high processor usage (not shown in FIG. 5).

Figure 6:
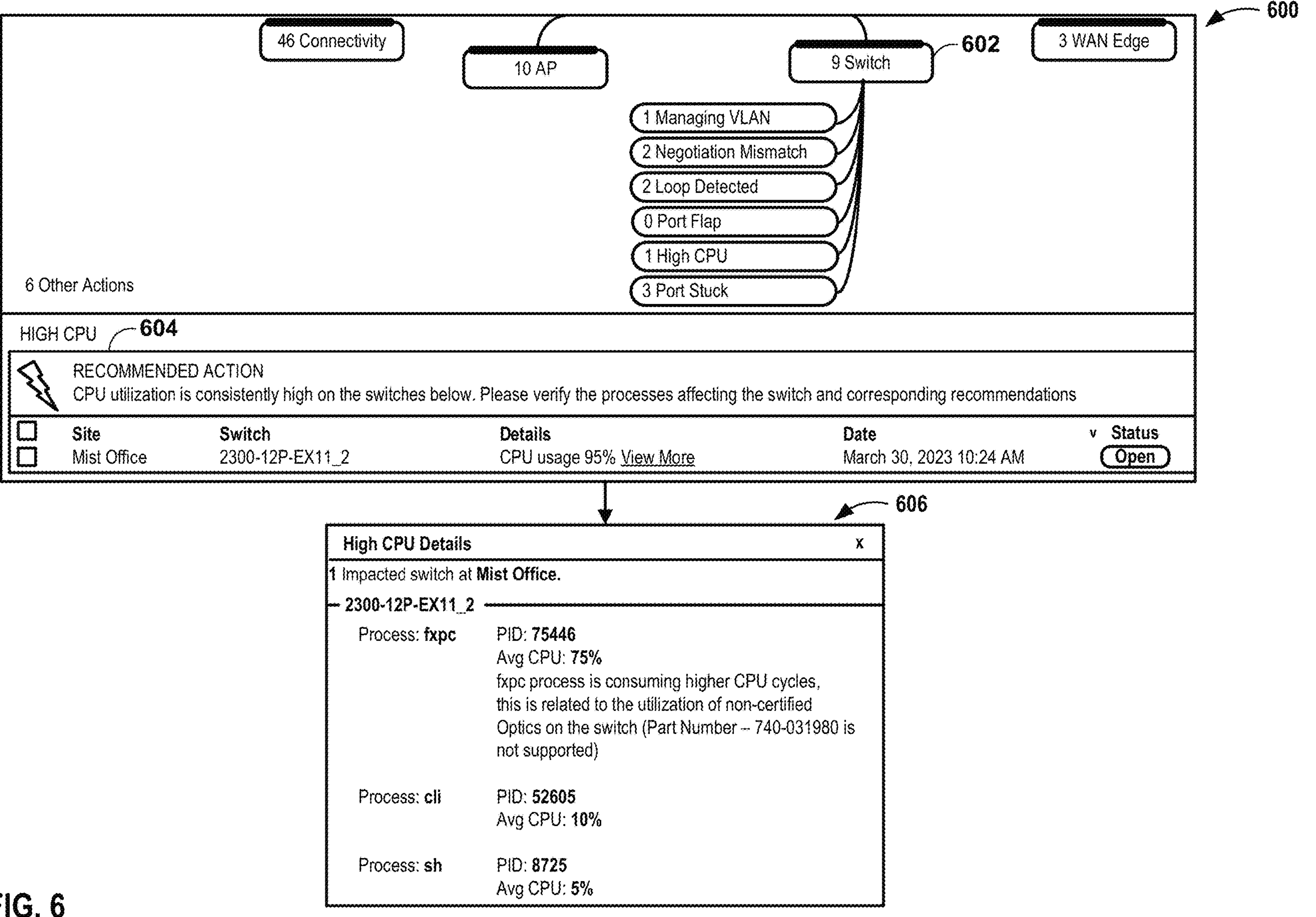
FIG. 6 illustrates an example graphic user interface that provides a view of details of the root cause of network issues and recommended actions to remediate the network issues.

FIG. 6 illustrates an example graphic user interface that provides a view of the root cause of network issues. FIG. 6 is described with respect to FIGS. 1-3. A network management system, such as network management system 300, may generate data representative of a graphical user interface for display on a user interface device (e.g., user interface device 310), which may be operated by a network administrator of the enterprise network.

As shown in FIG. 6, NMS 300 may output graphical user interface (GUI) 600 for display at, e.g., user interface device 310, to present indications of network issues (e.g., issues in network system 100) and indications of root causes of the network issues. For example, GUI 600 may present a view of root causes of issues of network switch 602, and one of the root causes of an issue of network switch 602 is high CPU usage. GUI 600 may present a recommended action 604 to remediate the high CPU usage by the network switch. For example, the recommended action 604 may indicate that the CPU usage of the network switch is at 95%.

If the user selects the option presented in GUI 600 to view more details regarding the high CPU usage of the network switch, NMS 300 may output GUI 606 that may present additional details regarding the high CPU usage of the network switch. For example, GUI 606 may indicate one or more processes executing at the CPU of the network switch that are consuming a high number of CPU cycles, and may also indicate that the high CPU usage of one of the processes executing at the CPU is related to utilization of a non-certified optical connector on the switch.

FIG. 7 illustrates an example graphic user interface that provides a view of the processor usage of processes at a network device. FIG. 7 is described with respect to FIGS. 1-3. A network management system, such as network management system 300, may generate data representative of a graphical user interface for display on a user interface device (e.g., user interface device 310), which may be operated by a network administrator of the enterprise network.

As shown in FIG. 7, NMS 300 may output graphical user interface (GUI) 700 for display at, e.g., user interface device 310, to present indications of network issues (e.g., issues in network system 100) and indications of root causes of the network issues. For example, GUI 700 may present a view of processes executing at one or more processors of a network switch during a time window and the processor utilization of each of the processes. GUI 700 may present an indication of one or more processes having high utilization of the one or more processors of the network switch. For example, GUI 700 may indicate that process "sh" has an average processor utilization of 6% during the time window, which may be high compared to historic processor utilization by the process "sh". As such, GUI 700 may indicate that the user is able to remediate the high processor usage of the network switch by terminating process "sh".

Figure 8:
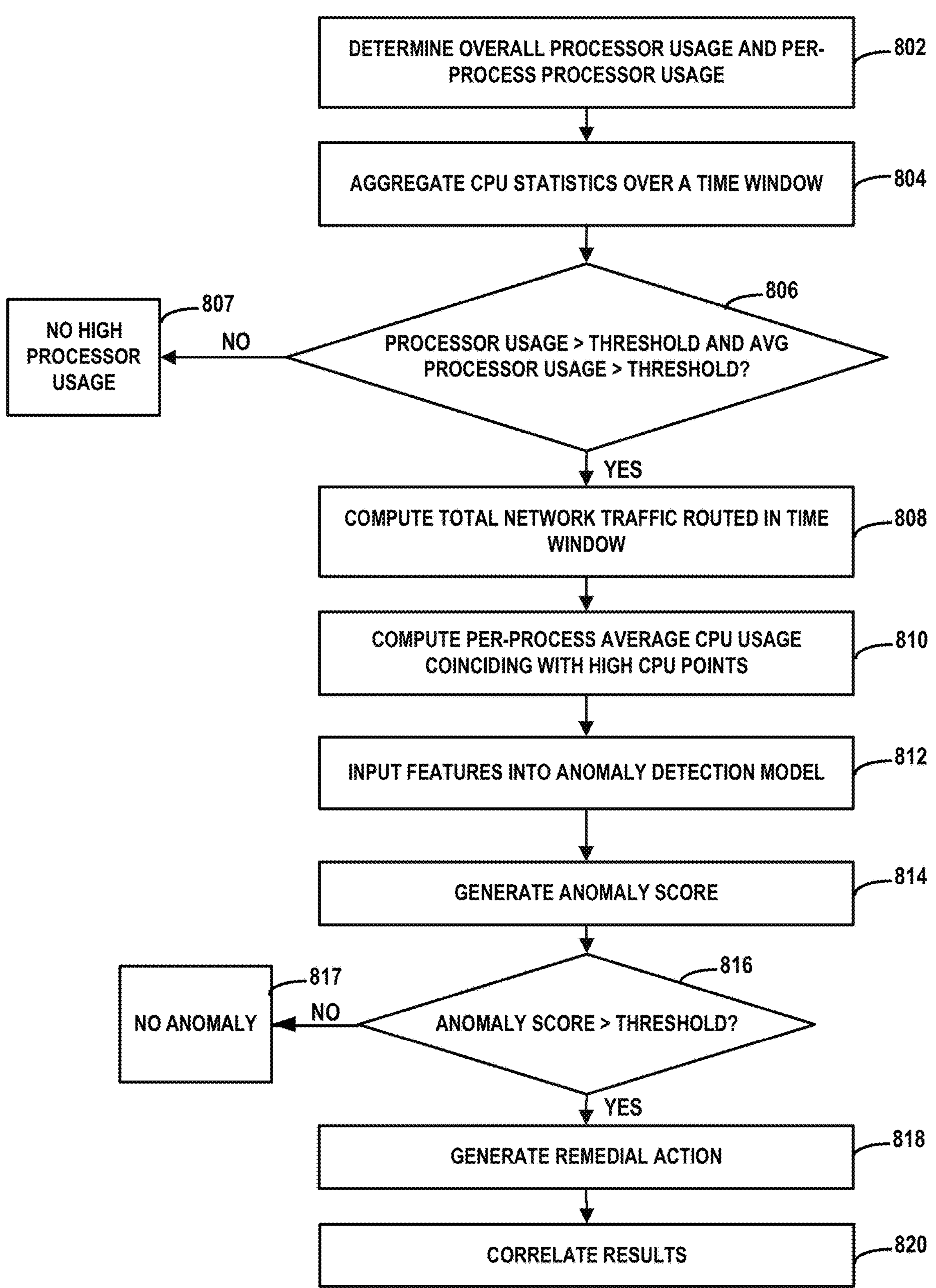
FIG. 8 is a flowchart illustrating example operations performed by an example network management system to detect and remediate high processor usage.

FIG. 8 is a flowchart illustrating example operations performed by an example network management system to detect and remediate high processor usage. FIG. 8 is described with respect to FIG. 3.

As shown in FIG. 8, processor usage engine 352 of NMS 300 may access processor (e.g., CPU) usage statistics of network devices (e.g., one or more switches 146), and may, for each of a plurality of network devices, determine the overall processor usage statistics of the network device and the per-process processor usage statistics of the network device (802). For example, Processor usage engine 352 may access such processor usage statistics stored in processor usage data 317.

Processor usage engine 352 may, for each of the plurality of network devices, aggregate the processor usage statistics over a time window (e.g., a 20 minute time window) based on the overall processor usage statistics of the network device and the per-process processor usage statistics of the network device (804). Processor usage engine 352 may determine a count (denoted herein as counter1) of the number of times the processor utilization of the network device within the time window is above a specified threshold (e.g., 90% of total processor utilization). Processor usage engine 352 may also determine the average processor utilization for the network device within the time window (denoted herein as avg_cpu) and the average per-process processor usage for the network device within the time window (denoted herein as avg_process_cpu).

Processor usage engine 352 may determine whether the count of the number of times the processor utilization of the network device within the time window is above a specified threshold is greater than a specified number, such as 2, and whether the average processor utilization for the network device within the time window is greater than a specified threshold, such as 80% or a long-term learned baseline percentage (806). If processor usage engine 352 determines that the count of the number of times the processor utilization of the network device within the time window is above the specified threshold is not greater than the specified number or that the average processor utilization for the network device within the time window is not greater than a specified threshold ("NO" at 806), processor usage engine 352 may determine that high processor usage was not detected at the network device during the time window (807). If processor usage engine 352 determines that the count of the number of times the processor utilization of the network device within the time window is above the specified threshold is greater than the specified number and that the average processor utilization for the network device within the time window is greater than a specified threshold ("YES" at 806), processor usage engine 352 may compute the total network traffic routed by the network device during the time window (808) and may also compute the average per-process processor usage that coincides with each time the processor utilization of the network device within the time window is above the specified threshold (810).

Processor usage engine 352 may therefore input the above-determined features into anomaly detection model 356. For example, processor usage engine 352 may input the values of counter1, avg_cpu, avg_process_cpu, the total network traffic routed by the network device during the time window, and the average per-process processor usage that coincides with each time the processor utilization of the network device within the time window is above the specified threshold into anomaly detection model 356 (812). Anomaly detection model 356 may output, based on the inputted information, an anomaly score, which may be a score between 0 and 1, and the most relevant features associated with the determined anomaly score (814).

Processor usage engine 352 may determine whether the anomaly score is greater than an anomaly score threshold (e.g., 0.6) (816). If processor usage engine 352 determines that the anomaly score is not greater than the anomaly score threshold ("NO" at 816), processor usage engine 352 may determine that the high processor usage of the network device is not caused by anomalous behavior (817). If processor usage engine 352 determines that the anomaly score is greater than the anomaly score threshold ("YES" at 816), processor usage engine 352 may determine that the high processor usage of the network device is caused by anomalous behavior and may save the calculated values for counter1, avg_cpu, avg_process_cpu. Processor usage engine 352 may also generate an action for user intervention, or may automatically remediate the anomaly by terminating the root cause process (818).

Processor usage engine 352 may repeat the process for additional batches of processor usage statistics (e.g., processor usage statistics for other time windows), and may correlate the results of such processes with features of previous batches of processor usage statistics, such as via exponential averaging (820).

Figure 9:
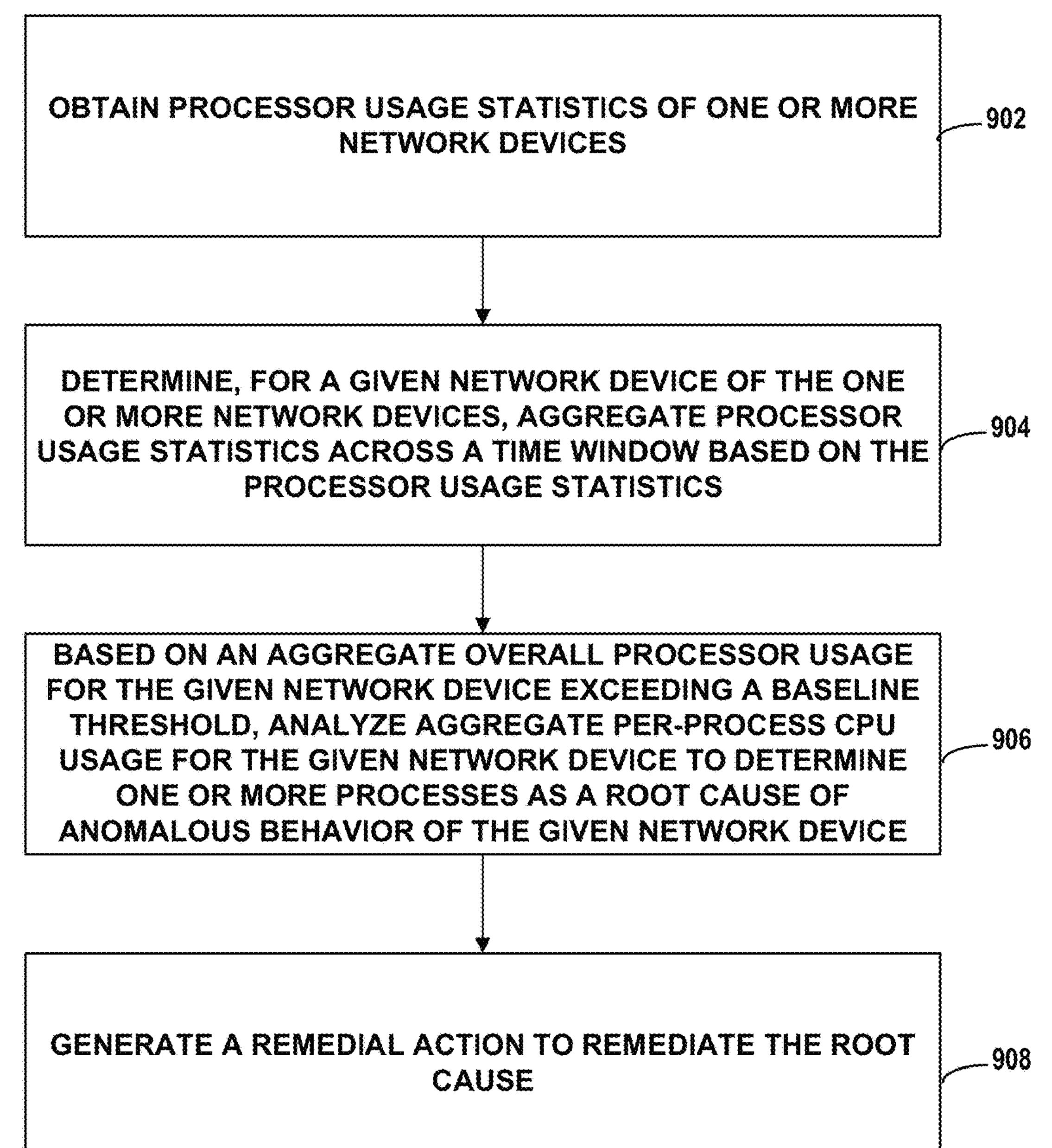
FIG. 9 is a flowchart illustrating example operations performed by an example network management system.

FIG. 9 is a flowchart illustrating example operations performed by an example network management system. FIG. 9 is described with respect to network management system 300 of FIG. 3. As shown in FIG. 9, one or more processors 306 of network management system 300 may obtain processor usage statistics of one or more network devices (e.g., switches 146) (902). The processor usage statistics of each network device include overall processor usage statistics and per-process processor usage statistics.

Processor(s) 306 may determine, for a given network device of the one or more network devices, aggregate processor usage statistics across a time window based on the processor usage statistics (904). To determine, for the given network device of the one or more network devices, aggregate processor usage statistics across a time window based on the processor usage statistics, processor(s) 306 may determine, for the given network device, a count of the times within the time window that an overall processor usage of the given network device exceeds a specified high processor usage threshold. Processor(s) 306 may also determine, for the given network device, an average overall processor usage of the given network device within the time window. To determine, for each network device of the one or more network devices, aggregate processor usage statistics across a time window based on the processor usage statistics, processor(s) 306 may determine, for the given network device, an average processor usage of each process executing at the given network device within the time window.

In some examples, processor(s) 306 may determine that the count of the times within the time window that the overall processor usage of the given network device exceeds the specified high processor usage threshold is greater than a high processor usage frequency threshold and may, in response to determining that the count of the times within the time window that the overall processor usage of the given network device exceeds the specified high processor usage threshold is greater than the high processor usage frequency threshold, determine that the aggregate overall processor usage for the given network device exceeds the baseline threshold.

In some examples, to analyze the aggregate per-process processor usage for the given network device, processor(s) 306 may determine a total network traffic that was routed via the given network device during the time window, and determine, based on the total network traffic that was routed via the given network device during the time window and the average processor usage of each process executing at the given network device within the time window, the one or more processes as the root cause of the anomalous behavior of the given network device.

Processor(s) 306 may, based on an aggregate overall processor usage for a given network device exceeding a baseline threshold, analyze aggregate per-process processor usage for the given network device to determine one or more processes as a root cause of anomalous behavior of the given network device (906). To determine the one or more processes as the root cause of the anomalous behavior of the given network device, processor(s) 306 may input the total network traffic that was routed via the given network device during the time window and the average processor usage of each process executing at the given network device within the time window into an anomaly detection model 356 to determine the one or more processes as the root cause of the anomalous behavior of the given network device.

In some examples, the anomaly detection model 356 is trained via machine learning to perform heuristic-based detection of anomalous behaviors that are the root cause of high processor usage by network devices. In some examples, the anomaly detection model 356 outputs an anomaly score. Processor(s) 306 may determine that the anomaly score outputted by the anomaly detection model 356 is greater than an anomaly score threshold may, in response to determining that the anomaly score is greater than the anomaly score threshold, determine that high processor usage of the given network device is caused by the anomalous behavior of the given network device.

Processor(s) 306 may generate a remedial action to remediate the root cause (908). To generate the remedial action, processor(s) 306 may automatically terminate the one or more processes determined as the root cause of the anomalous behavior of the given network device. The one or more processes include a user space process. The one or more processes may also include a system space process that has been whitelisted for automatic termination.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network management system comprising:
a memory; and
one or more processors coupled to the memory and configured to:
obtain processor usage statistics of one or more network devices;
determine, for a given network device of the one or more network devices, aggregate processor usage statistics across a time window based on the processor usage statistics;
based on an aggregate overall processor usage for the given network device exceeding a baseline threshold, analyze aggregate per-process processor usage for the given network device to determine one or more processes as a root cause of anomalous behavior of the given network device; and
generate a remedial action to remediate the root cause, including automatically terminating the one or more processes determined as the root cause of the anomalous behavior of the given network device.

2. The network management system of claim 1, wherein to determine the aggregate processor usage statistics for the given network device, the one or more processors are configured to determine, for the given network device, a count of times within the time window that an overall processor usage of the given network device exceeds a specified high processor usage threshold.

3. The network management system of claim 2, wherein the one or more processors are further configured to:
determine that the count of times within the time window that the overall processor usage of the given network device exceeds the specified high processor usage threshold is greater than a high processor usage frequency threshold; and
based on determining that the count of times within the time window that the overall processor usage of the given network device exceeds the specified high processor usage threshold is greater than the high processor usage frequency threshold, determine that the aggregate overall processor usage for the given network device exceeds the baseline threshold.

4. The network management system of claim 1, wherein to determine the aggregate processor usage statistics for the given network device, the one or more processors are configured to determine, for the given network device, at least one of an average overall processor usage of the given network device within the time window or an average processor usage of each process executing at the given network device within the time window.

5. The network management system of claim 4, wherein to analyze the aggregate per-process processor usage for the given network device, the one or more processors are further configured to:
determine a total network traffic that was routed via the given network device during the time window; and
determine, based on the total network traffic that was routed via the given network device during the time window and the average processor usage of each process executing at the given network device within the time window, the one or more processes as the root cause of the anomalous behavior of the given network device.

6. The network management system of claim 5, wherein to determine the one or more processes as the root cause of the anomalous behavior of the given network device, the one or more processors are further configured to input the total network traffic that was routed via the given network device during the time window and the average processor usage of each process executing at the given network device within the time window into an anomaly detection model to determine the one or more processes as the root cause of the anomalous behavior of the given network device.

7. The network management system of claim 6, wherein the anomaly detection model is trained via machine learning to perform heuristic-based detection of anomalous behaviors that are the root cause of high processor usage by network devices.

8. The network management system of claim 6, wherein the anomaly detection model outputs an anomaly score, and wherein the one or more processors are further configured to:

determine that the anomaly score output by the anomaly detection model is greater than an anomaly score threshold; and based on determining that the anomaly score is greater than the anomaly score threshold, determine that high processor usage of the given network device is caused by the anomalous behavior of the given network device.

9. The network management system of claim 1, wherein the one or more processes include a system space process that has been whitelisted for automatic termination.

10. A method comprising:

obtaining, by one or more processors of a network management system, processor usage statistics of one or more network devices;

determining, by the one or more processors and for a given network device of the one or more network devices, aggregate processor usage statistics across a time window based on the processor usage statistics;

based on an aggregate overall processor usage for the given network device exceeding a baseline threshold, analyzing, by the one or more processors, aggregate per-process processor usage for the given network device to determine one or more processes as a root cause of anomalous behavior of the given network device; and generating, by the one or more processors, a remedial action to remediate the root cause, including automatically terminating the one or more processes determined as the root cause of the anomalous behavior of the given network device.

11. The method of claim 10, wherein determining the aggregate processor usage statistics for the given network device further comprises determining, by the one or more processors and for the given network device, a count of times within the time window that an overall processor usage of the given network device exceeds a specified high processor usage threshold.

12. The method of claim 11, further comprising:

determining, by the one or more processors, that the count of times within the time window that the overall processor usage of the given network device exceeds the specified high processor usage threshold is greater than a high processor usage frequency threshold; and based on determining that the count of times within the time window that the overall processor usage of the given network device exceeds the specified high processor usage threshold is greater than the high processor usage frequency threshold, determining, by the one or more processors, that the aggregate overall processor usage for the given network device exceeds the baseline threshold.

13. The method of claim 10, wherein determining the aggregate processor usage statistics across the time window based on the processor usage statistics further comprises:

determining, by the one or more processors and for the given network device, at least one of an average overall processor usage of the given network device within the time window or an average processor usage of each process executing at the given network device within the time window.

14. The method of claim 13, wherein analyzing the aggregate per-process processor usage for the given network device further comprises:

determining, by the one or more processors, a total network traffic that was routed via the given network device during the time window; and determining, by the one or more processors, based on the total network traffic that was routed via the given network device during the time window and the average processor usage of each process executing at the given network device within the time window, the one or more processes as the root cause of the anomalous behavior of the given network device.

15. The method of claim 14, wherein determining the one or more processes as the root cause of the anomalous behavior of the given network device further comprises inputting, by the one or more processors, the total network traffic that was routed via the given network device during the time window and the average processor usage of each process executing at the given network device within the time window into an anomaly detection model to determine the one or more processes as the root cause of the anomalous behavior of the given network device.

16. The method of claim 15, wherein the anomaly detection model is trained via machine learning to perform heuristic-based detection of anomalous behaviors that are the root cause of high processor usage by network devices.

17. The method of claim 15, wherein the anomaly detection model outputs an anomaly score, the method further comprising:

determining, by the one or more processors, that the anomaly score outputted by the anomaly detection model is greater than an anomaly score threshold; and based on determining that the anomaly score is greater than the anomaly score threshold, determining, by the one or more processors, that high processor usage of the given network device is caused by the anomalous behavior of the given network device.

18. Non-transitory computer readable storage media comprising instructions that, when executed by one or more processors of a network management system, cause the one or more processors to:

obtain processor usage statistics of one or more network devices;

determine, for a given network device of the one or more network devices, aggregate processor usage statistics across a time window based on the processor usage statistics;

based on an aggregate overall processor usage for the given network device exceeding a baseline threshold, analyze aggregate per-process processor usage for the given network device to determine one or more processes as a root cause of anomalous behavior of the given network device; and generate a remedial action to remediate the root cause, including automatically terminating the one or more processes determined as the root cause of the anomalous behavior of the given network device.

* * * * *